United States Patent [19]

Narbaits-Jaureguy et al.

[11] 4,232,285
[45] Nov. 4, 1980

[54] ELECTROMAGNETIC DETECTOR RESPONSIVE TO A MODIFICATION OF A MAGNETIC FIELD

[75] Inventors: Jean-Raymond Narbaits-Jaureguy; Henri Billottet; Pierre Granier, all of Paris, France

[73] Assignee: Thomson-CSF, Paris, France

[21] Appl. No.: 852,726

[22] Filed: Nov. 18, 1977

[30] Foreign Application Priority Data

Nov. 19, 1976 [FR] France .................. 76 34916

[51] Int. Cl.³ .............. G08G 1/02; G01N 27/72; E01F 11/00
[52] U.S. Cl. .................. 340/38 L; 324/233
[58] Field of Search .............. 340/38 L, 552, 551, 340/567, 572, 553; 324/228, 233, 236, 246; 180/167, 168, 169

[56] References Cited

U.S. PATENT DOCUMENTS

| | | | |
|---|---|---|---|
| 3,222,637 | 12/1965 | Gray | 340/38 L |
| 3,395,341 | 7/1968 | Malaquin | 340/38 L |
| 3,436,649 | 4/1969 | Takechi et al. | 340/38 L |
| 3,818,430 | 6/1974 | Williams | 340/38 L |
| 3,825,889 | 7/1974 | Koerner | 340/38 L |
| 3,906,436 | 9/1975 | Kurauchi et al. | 340/38 L |
| 3,911,389 | 10/1975 | Mills | 340/38 L |
| 3,944,912 | 3/1976 | Angel et al. | 340/38 L |
| 4,075,553 | 2/1978 | Bouverot et al. | 340/38 L |

Primary Examiner—John W. Caldwell, Sr.
Assistant Examiner—Donnie L. Crosland
Attorney, Agent, or Firm—Karl F. Ross

[57] ABSTRACT

An electromagnetic detector designed to monitor road traffic, responsive to a modification of an electromagnetic field produced by the presence of a metallic mass in the vicinity thereof, comprises a metal base on which are disposed a transmitting coil creating a field and a receiving coil whose axis deviates from the perpendicular to the base. The receiving coil detects a measuring field created by the currents induced in the base by the transmitted field. The processed signal is the resultant of the signal produced by the presence of a metallic mass in the transmitted field and by the signal due to the measuring field.

21 Claims, 11 Drawing Figures

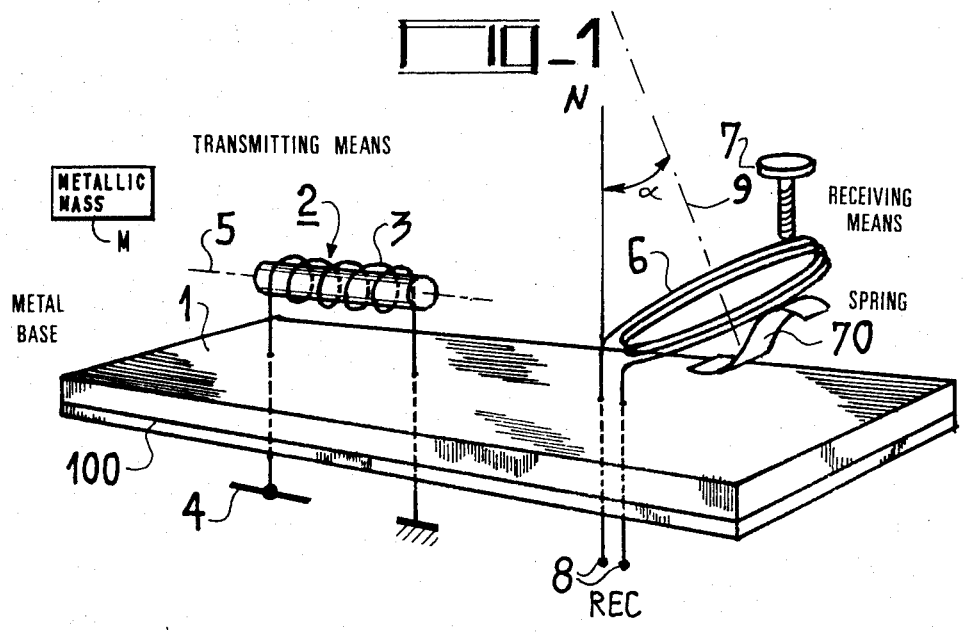
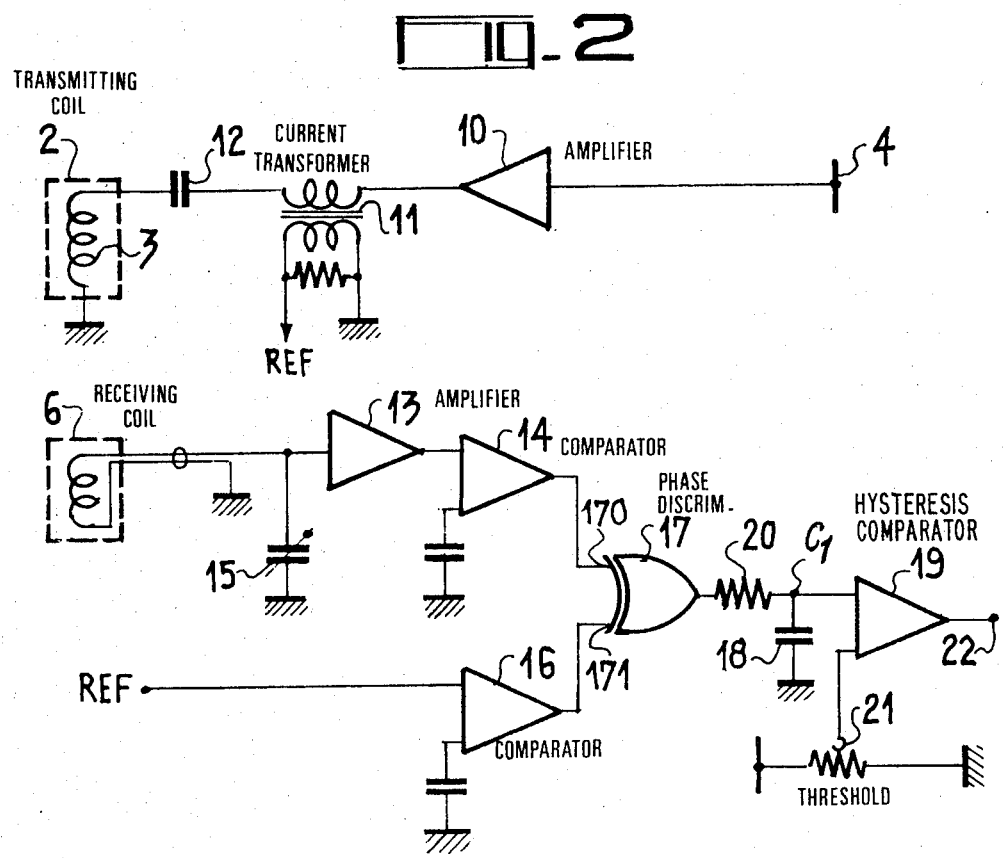

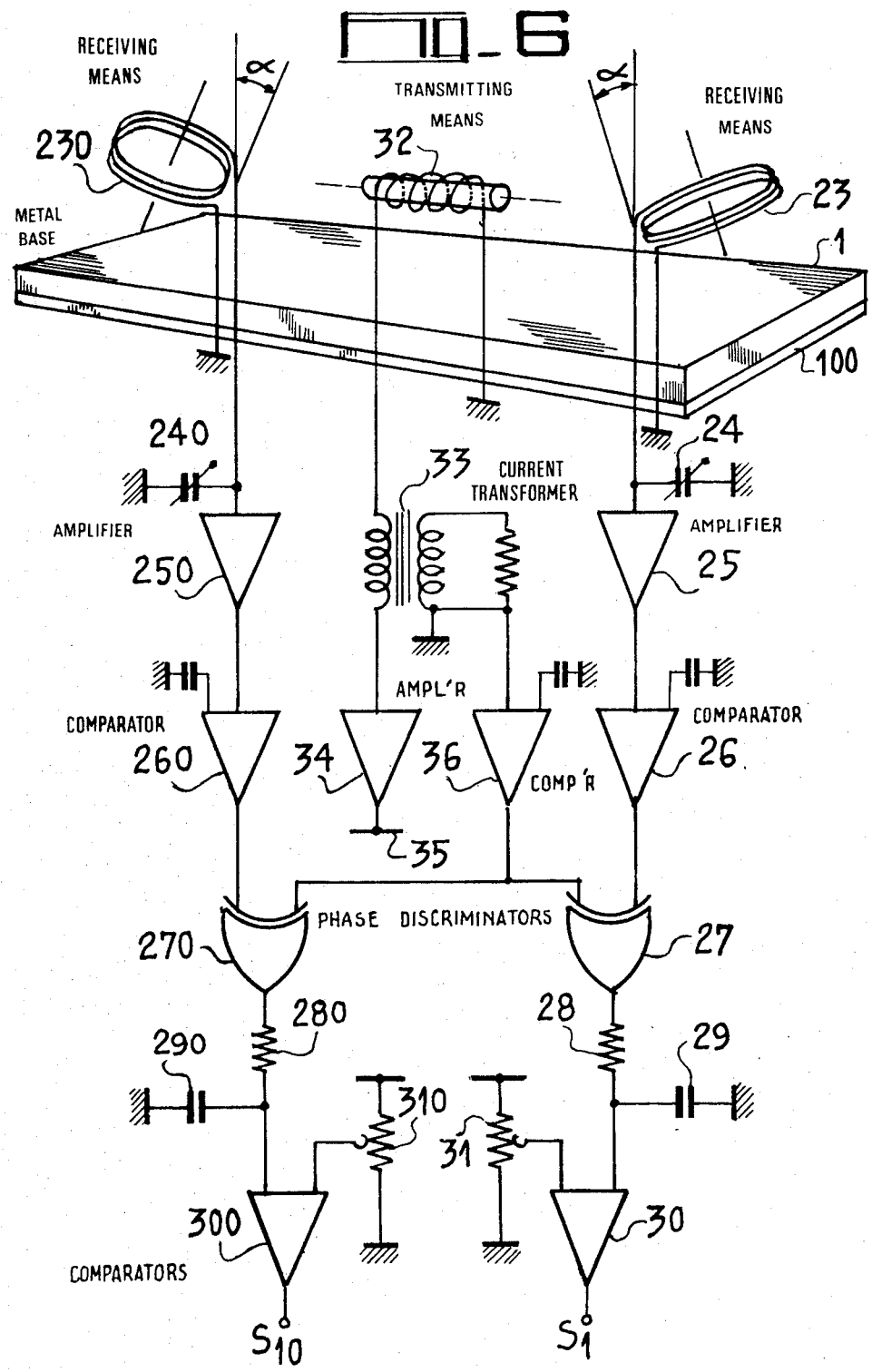

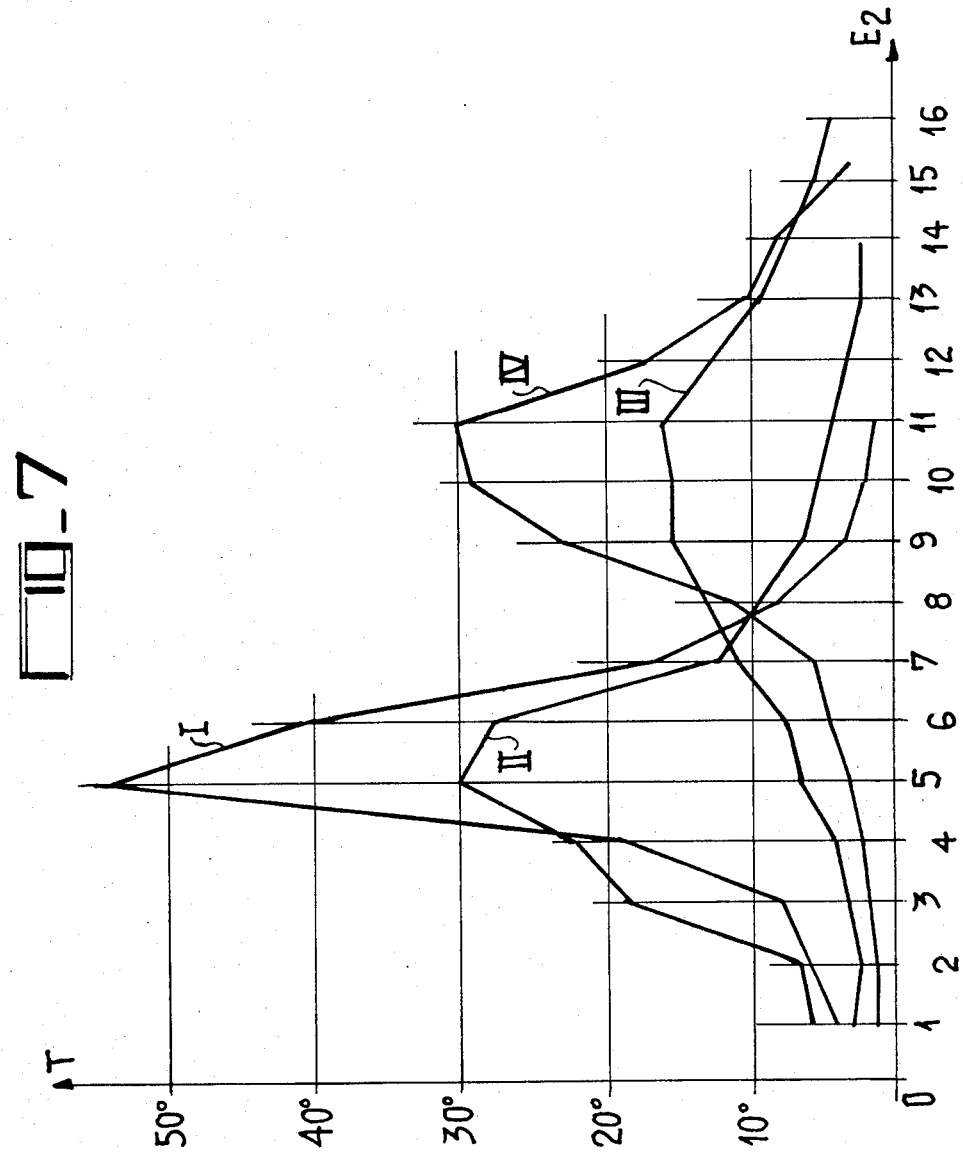

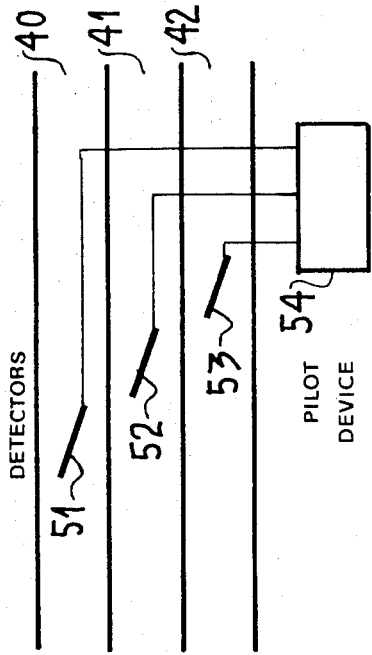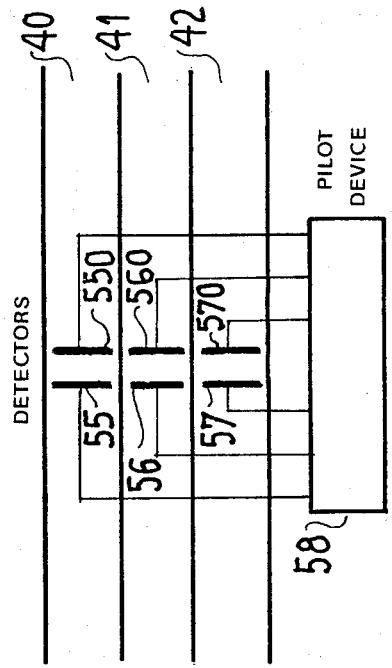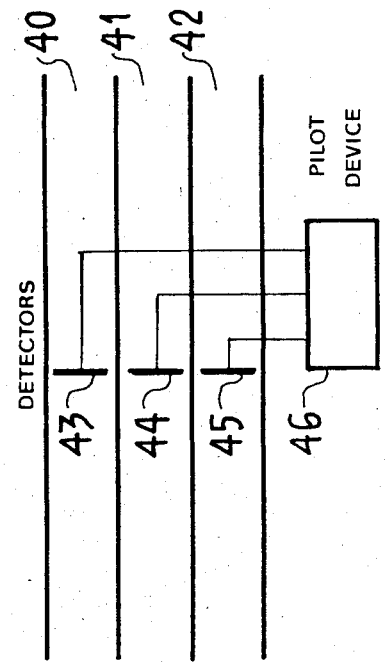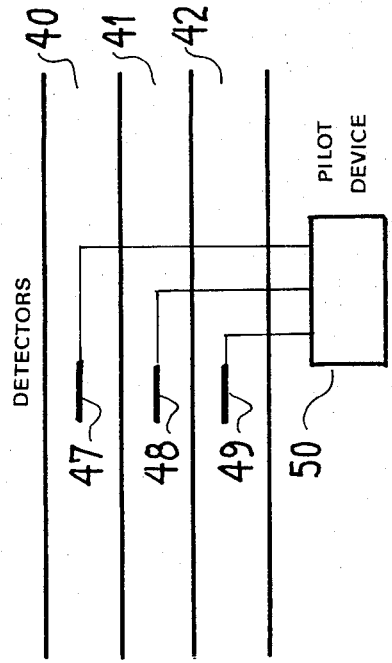

ELECTROMAGNETIC DETECTOR RESPONSIVE TO A MODIFICATION OF A MAGNETIC FIELD

FIELD OF THE INVENTION

The present invention relates to an electromagnetic detector responsive to a modification of a magnetic field in a system for the monitoring of road traffic.

BACKGROUND OF THE INVENTION

In the field of road traffic which tends to increase every day, research has been carried out to facilitate as far as possible the flow of the traffic by establishing detours when the traffic undergoes a considerable slow down owing to the accumulation of vehicles on a highway or road section. The elimination of congestion requires knowledge of a certain number of data concerning the vehicles, their passage at a given location, their direction, their speed, etc.

All these items of information may be obtained from magnetic detectors which are disposed on alongside the road or embedded in the latter and which comprise at least one transmitting means, usually a coil, whose excitation creates a magnetic field around the detector, and receiving means such as a single or double coil or frame. A metallic mass, usually a vehicle, which is located in or enters the magnetic field created by the transmitting means disturbs the lines of force of the transmitted field. This disturbance is detected by the receiving means and the information gathered therefrom is processed in associated electronic circuits.

OBJECT OF THE INVENTION

The object of the present invention is to provide a detector of increased persitivity for the purpose set forth.

SUMMARY OF THE INVENTION

According to a feature of our invention, the aforementioned transmitting and receiving means are so disposed on a metallic base with respect to each other and with respect to the base that the currents induced in the base by the transmitted field create in the receiving coil a measuring field whose representative vector has an amplitude and phase, relative to the transmitted field serving as a reference vector, which is a function of the intensity of the currents induced in the base and of the position of the receiving means relative thereto. An associated processor derives an output signal from the signal created by the measuring-field vector and the signal created by the field vector induced in the receiving means by the metallic mass located in the transmitted field.

BRIEF DESCRIPTION OF THE DRAWINGS

These and other features of our invention will be described in detail hereinafter with reference to the accompanying drawing in which:

FIG. 1 is a diagrammatic isometric view of a detector according to the invention;

FIG. 2 is a diagrammatic view of an electronic processor evaluating the signal delivered by the detector;

FIG. 6 shows a modification of the detector of FIGS. 1 and 2;

FIG. 7 shows a series of curves showing the sensitivity of the detector as a function of the angle of the receiving coil with respect to the perpendicular to the base and of the amplitude of the signal induced by a metallic mass; and FIGS. 8, 9, 10 and 11 show different arrays of detectors according to the invention.

SPECIFIC DESCRIPTION

Figure 3:
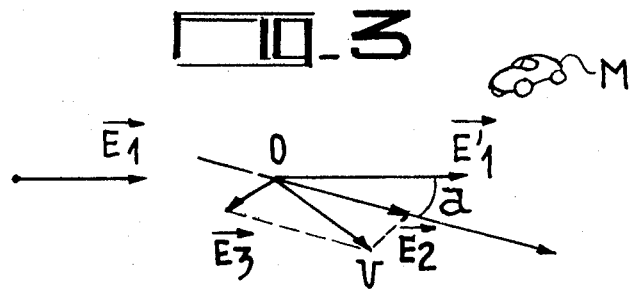
FIG. 3 is a vector diagram of the fields involved in the operation of the detector.

FIG. 1 shows diagrammatically the physical appearance of a detector according to the invention. This detector comprises a metal base 1 supporting a cylindrical coil 2 around which extends a winding 3 connected to a source of alternating current 4. This axis 5 of the transmitting coil 2 is parallel to the place of the base and extends in the direction of the length thereof. Disposed at the other end of the base 1 is a flat receiving coil 6 with a winding connected to the terminals 8 of an electronic utilization circuit or processor REC. The axis 9 of this coil includes an angle $\alpha$ with the perpendicular N to the base 1. A screw 7 and a leaf spring 70 represent means for adjusting this angle $\alpha$.

FIG. 2 shows diagrammatically the electronic circuitry of the processor REC associated with the detector of FIG. 1.

Starting at the source 4, we have provided an amplifier 10 connected to the winding 3 of the transmitting coil 2 through a capacitor 12. A current transformer 11 has the primary winding thereof inserted in the connection between the amplifier 10 and the coil 3 and the secondary winding thereof connected to the reference input REF of a comparator 16 which is included in the processing network connected to the receiving coil 6. The winding of the latter is connected to an amplifier 13 having a linear characteristic. This amplifier supplies current to a comparator 14 whose second input is grounded through a decoupling capacitor. An adjustable capacitor 15 permits tuning of the coil 6 to the frequency of the pilot-oscillator source 4. The output of the comparator 14 is connected to a first input 170 of a phase discriminator 17 whose second input 171 is connected to the output of comparator 16 receiving the reference oscillator delivered by the secondary winding of the current transformer. In a preferred embodiment, as shown, this discriminator is an Exclusive-OR logic circuit or XOR gate. The output of the phase discriminator 17 is connected to an integrating circuit with a series resistance 20 and a shunt capacitance 18 supplying current to the input of a comparator 19 whose other input is connected to a top of a potentiometer 21 serving as a threshold circuit. The output 22 of the comparator 19 supplies the output signal of the detector.

We shall now describe, with reference to FIG. 3, the operation of the detector shown in FIGS. 1 and 2.

When the winding 3 of the coil 2 carries electric current from the source 4, an electromagnetic field $\vec{E}_1$ is produced around the detector. This field induces in a nearby metallic mass M, represented in FIG. 3 by a vehicle located in or entering the field $\vec{E}_1$, currents which in turn will radiate a field about the base plate which would be in an ideal case in phase with the field produced by the transmitting coil 2. However, owing to losses within the metallic mass M, the vector $\vec{E}_2$ representing the retransmitted field is not in phase with the vector $\vec{E}_1$ but has a phase shift a relative to a reference vector $\vec{E}'_1$ parallel to the vector $\vec{E}_1$. This field $E_2$ constitutes what may be termed the disturbance of the transmitted field $\vec{E}_1$ due to the presence of the metallic mass M in the transmitted field $\vec{E}_1$.

This disturbance is detected by the receiving coil 6 and the information it contains is delivered by the processor of FIG. 2 which evaluates the phase of the signal appearing at the coil terminals 8.

By inclining the coil axis 9 at the aforementioned angle $\alpha$ with reference to the base normal N, we are able to increase the sensitivity of the detector with suppression of ambient influences by improving the signal-to-noise ratio. The variation of this angle with respect to the base permits choosing the amplitude and the phase of the measuring field $\vec{E}_3$, induced in the receiving coil, relative to vector $E_1$. The angle between the field vectors $\vec{E}_1$ and $\vec{E}_3$ must, however, be different from 180° (which would be the case if the coil axes 5 and 9 were parallel or aligned). It will be noted that angle $\alpha$ is usually of low value, of the order of 5° to 10°, if it is desired to obtain an amplitude of the measuring vector $\vec{E}_3$ which is reltively small with respect to the mean induced voltage due to the presence of a metallic mass. If axis 9 were perpendicular to base 1, vector $\vec{E}_3$ would have zero amplitude.

The electromagnetic field to which the receiving coil is subjected is the resultant v of the field $\vec{E}_2$ retransmitted by the metallic mass M and the field $\vec{E}_3$ generated by the eddy currents induced in the base. This resultant vector v consequently has a large phase angle relative to the reference vector $\vec{E}_1$ or $\vec{E}'_1$.

Figure 4:
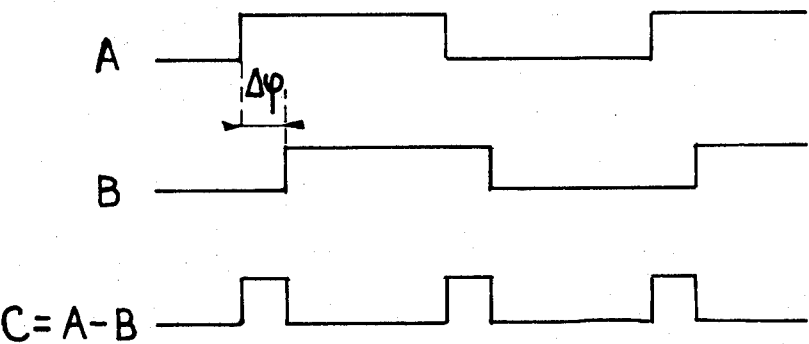
FIG. 4 is a set of graphs relating to the operation of the phase discriminator included in the processor of FIG. 2.

The output signal of coil 6, appearing across terminals 8, is applied to the processor of FIG. 2. The comparator 14 delivers a clipped signal (square wave A) to the input 170 of phase discriminator 17 whose second input 171 receives from the output of comparator 16 another clipped signal (square wave B) derived from the reference oscillation obtained at the output REF of the secondary winding of current transformer 11 whose primary winding is in series with source 4 and transmitting coil 2. The use of a current transformer has the advantage that the reference signal given thereby is proportional to the intensity vector which travels through the transmitting circuit and is exactly in phase with the field in fact radiated by the coil. Consequently, the environment modifies the linear constants of the transmitting circuit which creates a variable phase shift within the primary winding between the voltage vector and the current vector of the transmitting coil. By taking as reference the signal generated in the secondary winding of the current transformer 11, we are able to eliminate the deviations that the phase shift introduces. FIG. 4 serves to explain the operation of XOR gate 17 constituting the phase discriminator.

The quantized signal A is a square wave delivered by the detector; a similar square wave B is the reference signal. The difference $C = A - B$ is the signal delivered by the discriminator. It is evident that the signal C represents the phase shift between the signals A and B. This signal C is integrated in the filter circuit constituted by the resistor 20 and the capacitor 18 to yield a voltage $C_1$ (FIG. 5) which is proportional to the phase shift between the signals A and B. This voltage is compared in circuit 19 with the threshold voltage delivered by potentiometer 21. The output signal appearing at 22 may be sent to a display device or any other indicator not shown.

The evaluation of the information delivered by the detector may be improved by employing as the comparator 19 a hysteresis circuit which responds differently to rising and descending flanks of voltage pulses applied thereto.

Figure 5:
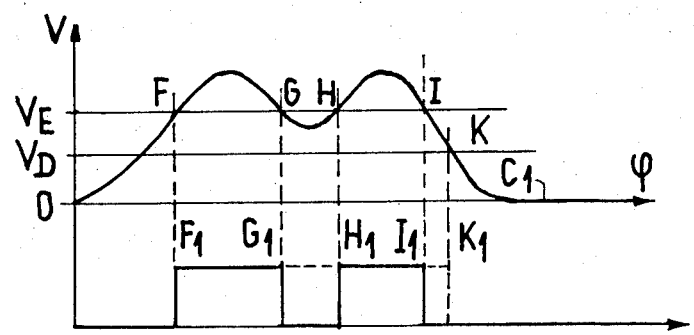
FIG. 5 is a graph relating to the operation of a hysteresis-type comparator also included in that processor.

FIG. 5 shows a diagram relating to the operation of such a comparator.

The integrated voltage $C_1$ applied to the hysteresis comparator 19 rises to F above the threshold voltage $V_E$ established by the potentiometer 21. A voltage level $V_D$ is a threshold value established by the comparator itself which is lower than level $V_E$. With an ordinary comparator, the points F, G, H, I of intersection of the curve $C_1$ with the threshold level $V_E$ would give rise to pulses $F_1$–$G_1$ and $H_1$–$I_1$ corresponding to the parts of the representative curve $C_1$ surpassing the threshold $V_E$.

The existence of an internal threshold VD established by the comparator itself has the result that for curve portions such as G–H, having a negative slope but remaining above the threshold $V_D$, the comparator does not react at the level-crossing point G. The comparator does not react either at the point of intersection I. On the other hand, the comparator output goes to zero at the point of intersection K of the curve $C_1$ with and the lower threshold $V_D$. The response to the hysteresis comparator 19 is therefore a single pulse $F_1$–$K_1$ despite the saggin of curve $C_1$ between points G and H.

As the sagging portion G-H of the curve $C_1$ is generally due to noise, an ordinary comparator would have falsely indicated the presence of two vehicles. The use of a hysteresis comparator provides increased protection against noises by delivering a signal which indicates the presence of a single vehicle.

We have already discussed hereinbefore the influence of the metal base 1 of the detector on the formation of the auxiliary measuring-field vector $\vec{E}_3$. This base is advantageously made of iron or Duralumin alloys or non-magnetic stainless steels.

The influence of this base may be still further improved by disposing under and against the base a relatively thick plate 100 (FIG. 1) of pure aluminum or like materials such as alloy G4A.

It will be noted that the disposition of the receiving coil 6 with the axis thereof generally but not exactly perpendicular to the base minimizes the influence of the currents induced in the ground. This protection is provided by the base itself which performs the function of a screen. Consequently, it appears unnecessary to provide around the transmitting and receiving coils electrostatic protecting shielding.

FIG. 6 shows a modification of the detector according to the invention obtained by disposing on a base 1 two receiving coils 23, 230 located at the two ends of the base and a transmitting coil 32 at the center of the base. The two receiving coils are inclined symmetrically at a small angle $\alpha$ with respect to the perpendicular to the base. Each of the receiving coils is associated with an electronic processing device in every way similar to that of FIG. 3 and comprising a linear amplifier 25, 250, a comparator 26, 260, a phase discriminator 27, 270, a filter circuit constituted by a resistor 28, 280 and a capacitor 29, 290, and a comparator 30, 300 associated with a threshold 31, 310; the two processors have outputs $S_1$ and $S_{10}$. The transmitting coil 32 is connected to a pilot-oscillation source 35 through an amplifier 34. A current transformer 33, whose primary winding is in series with coil 32, has the secondary winding thereof connected to a comparator 36 delivering a phase-reference signal to the phase discriminators 27, 270.

The operation of this detector, we may term a double detector, is the same as that described before. A detector of this type has the advantage of determining the position of the vehicle relative thereto from the value of the phase shift found at the output of one of the comparators 30, 300.

FIG. 7 shows a series of curves giving the sensitivity T of the detector in terms of phase angle as a function of the amplitude of the useful signal, that is to say of the field vector $\vec{E}_2$ induced in the receiving coil by a metallic mass M which is located in or enters the transmitted field. As a parameter, various values of the angle $\alpha$ and the measuring vector $\vec{E}_3$ have been used for the plotting of curves I, II, III and IV in FIG. 7.

For the curve I, the angle $\alpha$ is of the order of 3.5° and the amplitude of the vector $\vec{E}_3$ is of the order of 5 units; for the curve II, the angle $\alpha$ is of the order of 7° and the amplitude of the vector $\vec{E}_3$ is of the order of 10 units; for the curve III the angle $\alpha$ is of the order of 10° and the amplitude of the vector $\vec{E}_3$ of the order of 5 units; for the curve IV, the angle $\alpha$ is of the order of 5° and the amplitude of the vecotr $\vec{E}_3$ is of the order of 10 units.

An examination of these curves shows that the detector may be employed selectively for detecting types of vehicles which are differentiated by the amplitude of the signal they produce in the receiving coil.

It will also be noted that it is sufficient that the angle $\alpha$ to be chosen have a relatively low value between 5° and 10°; in this case, the distance between the transmitting and receiving coils is of the order of 50 to 70 cm.

We shall now describe several ways in which our improved detectors can be used and modifications thereof having been described, indications will now be given of the way in which these indicators are to be used and some of the advantages which can result therefrom.

FIG. 8 shows diagrammatically an array of three detectors 43, 44, 45 according to the invention which are disposed perpendicular to the direction of the traffic in as many lanes or roadways 40, 41, 42. These detectors are connected to a control station 46 which may contain the pilot source supplying current to the transmitting coils. If the detectors are of the simple type shown in FIG. 1, a response of one or more detectors indicates the presence of a vehicle on the roadway or roadways. If the detectors are of the double type shown in FIG. 6, the information provided is more precise. If the two outputs of such a double detector carry signals simultaneously, the vehicle is centered with reference to the detector. If a signal appears on only one or the other output, the vehicle is located on the corresponding side of the detector.

FIG. 9 shows an array of detectors 47, 48, 49 which have their bases disposed parallel to the direction of the traffic and are connected to a common pilot device or control unit 50.

With the use of double detectors, the passage of a vehicle on a roadway will here be indicated by two sequential responses. The order of appearance to the detector signals gives information about the direction of travel of the vehicle. This information may be extremely important on the middle lane of a three-lane highway, for example.

The offset between the leading edges of the pulses delivered by the two associated processing systems enables the speed of the vehicle to be calculated.

The duration of the output signal generated by each individual detector of a pair may enable the length of the passing vehicle to be determined.

FIG. 10 shows an array of detectors 51, 52, 53 connected to a pilot device or control unit 54 and disposed obliquely in the roadways. The items of information received are similar to those received with the perpendicular and parallel arrays of FIGS. 8 and 9.

FIG. 11 shows a fourth array comprising in each lane two transverse detectors spaced apart in the direction of the traffic. The detectors 55-550, 56-560, 57-570 are connected to a common control unit or pilot device 58. This positioning of the detectors is particularly suitable for measuring the speed of a vehicle by a determination of the offset of the leading edges of the pulse delivered by one and then the other detector.

What is claimed is:

1. An electromagnetic detector responsive to the proximity of a metallic mass, comprising:
    a metallic base having a flat upper surface;
    a supply of alternating current;
    transmitting means on said base, including a first coil with an axis parallel to said surface, connected to said supply for generating a surrounding electromagnetic field inducing eddy currents in said base;
    receiving means on said base, including a second coil with an axis inclined to said surface, spaced from said transmitting means and positioned to pick up a measuring field produced by said eddy currents together with a component of the surrounding field as modified by a metallic mass in the vicinity, thereby generating a resulting signal varying with the presence or absence of such mass; and
    processing means connected to said receiving means and to a source of reference oscillation energized from said supply for evaluating said resulting signal to indicate the proximity of said mass.

2. A detector as defined in claim 1 wherein said processing means includes a phase discriminator.

3. A detector as defined in claim 2 wherein said phase discriminator has a first input connected to said receiving means and a second input connected to said source of reference oscillation.

4. A detector as defined in claim 3 wherein said source is a current transformer in series with said transmitting means.

5. A detector as defined in claim 4, further comprising comparison means inserted in the input connections of said phase discriminator for converting said resulting signal and said reference oscillation into respective square waves.

6. A detector as defined in claim 5 wherein said phase discriminator comprises an Exclusive-OR gate.

7. A detector as defined in claim 2 wherein said processing means further comprises a comparison circuit with inputs respectively connected to said phase discriminator and to a generator of threshold voltage.

8. A detector as defined in claim 7 wherein said comparison circuit comprises a hysteresis comparator with an internal threshold at a level lower than that of said threshold voltage.

9. A detector as defined in claim 1 wherein the axis of said second coil includes an angle on the order of 5° to 10° with a line perpendicular to said surface.

10. A detector as defined in claim 1, further comprising adjusting means for varying the angle of inclination of said second coil.

11. A detector as defined in claim 1 wherein said base consists essentially of iron.

12. A detector as defined in claim 11 wherein said base consists of nonmagnetic stainless steel.

13. A detector as defined in claim 1 wherein said base consists essentially of aluminum.

14. A detector as defined in claim 13 wherein said base consists of Duralumin alloy.

15. A detector as defined in claim 1 wherein said receiving means further comprises a third coil symmetrically inclined with reference to said second coil, said first coil being disposed midway between said second and third coils.

16. A traffic monitor comprising at least one detector as defined in claim 1 disposed on a roadway.

17. A traffic monitor comprising a plurality of detectors as defined in claim 1 disposed on a plurality of parallel lanes of a roadway, said detectors being provided with a common control unit including said supply.

18. A traffic monitor as defined in claim 17 wherein said detectors have their bases perpendicular to said lanes.

19. A traffic monitor as defined in claim 17 wherein said detectors have their bases parallel to said lanes.

20. A traffic monitor as defined in claim 17 wherein said detectors have their bases oblique to said lanes.

21. A traffic monitor as defined in claim 17 wherein each lane is provided with two detectors spaced apart in the direction of traffic.

* * * * *